(12) United States Patent
Galsim et al.

(10) Patent No.: US 9,047,071 B2
(45) Date of Patent: Jun. 2, 2015

(54) METHOD AND APPARATUS FOR CONTROLLING DISTRIBUTION OF POWER

(75) Inventors: Marlon Galsim, Shanghai (CN); Wei-Shih Chiang, Shanghai (CN)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 430 days.

(21) Appl. No.: 13/699,073

(22) PCT Filed: May 21, 2010

(86) PCT No.: PCT/CN2010/073060
§ 371 (c)(1),
(2), (4) Date: Jan. 22, 2013

(87) PCT Pub. No.: WO2011/143829
PCT Pub. Date: Nov. 24, 2011

(65) Prior Publication Data
US 2013/0116846 A1 May 9, 2013

(51) Int. Cl.
*H02J 3/14* (2006.01)
*H01H 47/00* (2006.01)
(Continued)

(52) U.S. Cl.
CPC *G06F 1/26* (2013.01); *G06F 1/266* (2013.01); *G06F 1/28* (2013.01); *H01R 25/003* (2013.01);
(Continued)

(58) Field of Classification Search
CPC ......... Y04S 20/16; Y04S 20/32; Y04S 20/34; Y04S 20/38; Y04S 20/46; Y04S 20/222; Y04S 20/242; Y02B 70/3216; Y02B 70/3225; Y02B 70/3233; Y02B 70/325; Y02B 70/3266; Y02B 70/3291; Y02B 70/343; Y02B 90/222; Y02B 90/226; H02J 3/14; H02J 2003/143; H02J 9/005; G06F 1/266; G06F 1/3206; G06F 1/3234; G06F 1/325; G06F 2200/261
USPC ........... 307/11, 12, 31, 36–39, 112, 113, 115, 307/116, 125, 126, 130, 131; 713/300, 320, 713/324, 330, 340; 702/57, 60–62, 64; 705/63, 412; 700/286, 295, 297, 298
See application file for complete search history.

(56) References Cited

U.S. PATENT DOCUMENTS 7,944,086 B2 * 5/2011 Hodges et al. .................. 307/31
7,964,994 B2 * 6/2011 DuBose et al. ............... 307/126
(Continued)

FOREIGN PATENT DOCUMENTS

| CN | 2850053 Y | 12/2006 |
|---|---|---|
| CN | 200987067 Y | 12/2007 |

(Continued)

OTHER PUBLICATIONS

Notification of Transmittal of the International Search Report and the Written Opinion of the International Searching Authority from corresponding PCT/CN2010/073060 mailed Mar. 3, 2011.

*Primary Examiner* — Crystal J Barnes-Bullock
(74) *Attorney, Agent, or Firm* — Lando & Anastasi, LLP (57) ABSTRACT

A method and an apparatus for controlling distribution of power. The apparatus is used for controlling application of power to a plurality of devices including at least one master device and at least one controlled device. The apparatus includes: a power inlet constructed and arranged to receive power from a power source; a plurality of power outlets including at least one master power outlet (12M) and at least one controlled power outlet (12S); and means for generating a power profile of the at least one master device electrically connected to the master power outlet, determining a characteristic of a stand-by power consumption level of the at least one master device and controlling a supply of power from the power inlet to the at least one controlled power outlet in response to a comparison of a characteristic of power delivered to the at least one master device with the characteristic of the stand-by power consumption level.

20 Claims, 7 Drawing Sheets

(51) Int. Cl.
*H01H 83/00* (2006.01)
*H02H 3/00* (2006.01)
*G01R 21/06* (2006.01)
*G01R 19/00* (2006.01)
*G06F 11/30* (2006.01)
*G06F 1/26* (2006.01)
*G06F 1/28* (2006.01)
*H02J 9/00* (2006.01)
*H01R 25/00* (2006.01)

(52) U.S. Cl.
CPC . *H02J 3/14* (2013.01); *H02J 9/005* (2013.01); *Y02B 70/3225* (2013.01); *Y02B 70/3233* (2013.01); *Y02B 90/226* (2013.01); *Y04S 20/16* (2013.01); *Y04S 20/222* (2013.01); *Y04S 20/225* (2013.01)

(56) References Cited

U.S. PATENT DOCUMENTS

| | | | | |
|---|---|---|---|---|
| 7,973,425 B2* | 7/2011 | Chen | | 307/12 |
| 7,977,825 B2 | 7/2011 | Gilbert | | |
| 8,138,626 B2* | 3/2012 | Jonsson et al. | | 307/38 |
| 8,255,090 B2* | 8/2012 | Frader-Thompson et al. | | 700/295 |
| 8,335,936 B2* | 12/2012 | Jonsson et al. | | 713/300 |
| 8,447,541 B2* | 5/2013 | Rada et al. | | 702/60 |
| 8,633,612 B2* | 1/2014 | Bodnar | | 307/31 |
| 8,849,097 B2* | 9/2014 | Klappert | | 386/291 |
| 2002/0185916 A1 | 12/2002 | Barton et al. | | |
| 2007/0038334 A1 | 2/2007 | Chou et al. | | |
| 2008/0247109 A1 | 10/2008 | Chen et al. | | |
| 2009/0307505 A1 | 12/2009 | Robertson et al. | | |
| 2011/0254371 A1 | 10/2011 | Galsim et al. | | |
| 2011/0266870 A1* | 11/2011 | Hu | | 307/39 |
| 2012/0201062 A1 | 8/2012 | Lee | | |

FOREIGN PATENT DOCUMENTS

| | | |
|---|---|---|
| CN | 101243375 A | 8/2008 |
| CN | 101281394 A | 10/2008 |
| CN | 101582550 A | 11/2009 |
| CN | 102265470 A | 11/2011 |
| DE | 10 2006 053280 A1 | 5/2008 |
| EP | 1494110 A2 | 1/2005 |
| EP | 2 184 816 A1 | 5/2010 |
| GB | 2218274 A | 11/1989 |
| WO | 2006136812 A1 | 12/2006 |

* cited by examiner

METHOD AND APPARATUS FOR CONTROLLING DISTRIBUTION OF POWER

BACKGROUND OF INVENTION

1. Field of the Invention

Embodiments of the present disclosure relate generally to methods and systems for analyzing and managing distribution of power to multiple devices from a common power source.

2. Discussion of Related Art

Some home and office equipment manufacturers have implemented stand-by power saving technology in their products. In accordance with this technology, home and office equipment that consumes electrical power may automatically transfer to a stand-by power saving mode when not used for a period of time, thus reducing overall power consumption. Some television sets and personal computers utilize this stand-by power saving mode, but many peripherals such as computer monitors, DVD players, audio amplifiers, printers, scanners, and handheld device battery chargers are not typically configured to enter a stand-by or sleep mode upon periods of non-use, and thus may consume considerable amounts of energy even when not in use.

Several solutions to disable power to peripherals under certain conditions exist currently in the market. Such examples include surge protectors that offer "master" and "controlled" outlets. The CPU of a computer, a television, or a receiver of an audio/video (A/V) system is plugged into the "master" or "primary" outlet. The system peripherals are connected to the "controlled" or "secondary" outlets. When the device plugged into the "master" outlet goes into stand-by power mode, as determined by the current drawn by the "master" device falling below a factory pre-set current setpoint, the "controlled" outlets are turned off, thereby reducing energy consumption by cutting power to these peripherals which otherwise may continue to use power even though not in use.

SUMMARY OF THE INVENTION

Aspects in accord with the present invention are directed to a system or method for analyzing and managing distribution of power to multiple devices from a common power source.

In one aspect, the present invention features an apparatus for controlling application of power to a plurality of devices including at least one master device and at least one controlled device. The apparatus may comprise a power inlet constructed and arranged to receive power from a power source, a plurality of power outlets including at least one master power outlet and at least one controlled power outlet; a sense circuit adapted to sense at least one first characteristic of power delivered to the at least one master power outlet, and a controller adapted to generate at least one first power profile corresponding to the at least one first characteristic, compare the at least one first power profile with at least one second power profile stored in at least one profile database and determine whether the at least one first power profile is similar to the at least one second power profile, determine a characteristic of a stand-by power consumption level of a device electrically connected to the at least one master power outlet, wherein the stand-by power consumption level is extracted from the at least one second power profile in response to a determination that the at least one first power profile is similar to the at least one second power profile, and wherein the stand-by power consumption level is extracted from the at least one first power profile in response to a determination that the at least one first power profile is not similar to the at least one second power profile, compare the first characteristic of power delivered to the at least one master power outlet with the characteristic of the stand-by power consumption level, and control a supply of power from the power inlet to the at least one controlled outlet responsive to the comparison of the first characteristic of power with the characteristic of the stand-by power consumption level.

According to one embodiment, the at least one first characteristic of power delivered to the at least one master power outlet is current. In another embodiment, the at least one first characteristic of power delivered to the at least one master power outlet further comprises voltage.

According to one embodiment, the characteristic of the stand-by power consumption level is total power. In another embodiment, the characteristic of the stand-by power consumption level is current.

According to one embodiment, the apparatus may further comprise a non-volatile memory configured to store a representation of the stand-by power consumption level. In another embodiment, the at least one profile database includes a pre-programmed profile database.

According to one embodiment, in response to a determination that the at least one first power profile is not similar to the at least one second power profile, the controller is further adapted to store the at least one first power profile in the at least one profile database.

According to another embodiment, the apparatus may further comprise an uninterruptable power supply.

In another aspect, the present invention features a method of controlling power distribution to a plurality of devices including at least one master device and at least one controlled device, the at least one master device having at least a first mode of operation and a second mode of operation, with the second mode of operation being a lower power mode of operation than the first mode of operation. The method may comprise providing power to the at least one master device through at least one primary outlet, sensing at least one characteristic of the power provided through the at least one primary outlet with the at least one master device in the second mode of operation, generating, based on the act of sensing, a first power profile of the at least one master device, comparing the first power profile with at least one second power profile stored in at least one database and determining whether the first power profile is similar to the at least one second power profile, setting a first threshold characteristic of the power provided through the primary outlet, wherein the first threshold characteristic is extracted from the at least one second power profile in response to a determination that the first power profile is similar to the at least one second power profile, and wherein the first threshold characteristic is extracted from the first power profile in response to a determination that the first power profile is not similar to the at least one second power profile, providing power, in the first mode of operation, to the at least one controlled device through a secondary outlet, measuring an operating characteristic of power provided through the primary outlet, and controlling power to the at least one controlled device responsive to the measured operating characteristic of power provided through the primary outlet.

According to one embodiment, the method may further comprise verifying, in response to a determination that the first power profile is not similar to the at least one second power profile, whether the first power profile is accurate.

According to another embodiment, the method may further comprise storing, in response to a determination that the first power profile is accurate, the first power profile in the at least one database.

According to one embodiment, sensing the at least one characteristic of power provided through the primary outlet to the master device is initiated manually by a user. In another embodiment, the method may further comprise providing an indication that the master device is operating in the second mode of operation.

According to one embodiment, the method may further comprise removing, in the second mode of operation, power to the at least one controlled device responsive to the operating characteristic of power provided through the primary outlet being at least one of the same as or less than the first threshold characteristic of the power provided through the primary outlet.

According to another embodiment, the method may further comprise setting a second threshold characteristic of power provided through the primary outlet based on the sensed characteristic of the power provided through the primary outlet.

According to one embodiment, the act of providing power, in the first mode of operation, to the at least one controlled device through a secondary outlet comprises providing power to the at least one controlled device responsive to the operating characteristic of power provided through the primary outlet being greater than the second threshold characteristic of the power provided through the primary outlet.

According to another embodiment, the method may further comprise replacing the at least one master device with at least one second master device, the at least one second master device having at least a first mode of operation and a second mode of operation, with the second mode of operation being a lower power mode of operation than the first mode of operation, providing power to the at least one second master device through the at least one primary outlet, sensing at least one characteristic of the power provided through the primary outlet with the second master device in the second mode of operation, and generating, based on the act of sensing, a third power profile of the at least one second master device, comparing the third power profile with the at least one second power profile stored in the at least one database and determining whether the third power profile is similar to the at least one second power profile, and setting a third threshold characteristic of the power provided through the primary outlet, wherein the third threshold characteristic is extracted from the at least one second power profile in response to a determination that the third power profile is similar to the at least one second power profile, and wherein the third threshold characteristic is extracted from the third power profile in response to a determination that the third power profile is not similar to the at least one second power profile. In one embodiment, sensing the at least one characteristic of the power provided through the primary outlet with the second master device in the second mode of operation is initiated manually.

In another aspect, the present invention features an apparatus for controlling application of power to a plurality of devices including at least one master device and at least one controlled device. The apparatus may comprise a power inlet constructed and arranged to receive power from a power source, a plurality of power outlets including at least one master power outlet and at least one controlled power outlet, and means for generating a power profile of at least one master device electrically connected to the master power outlet, determining a characteristic of a stand-by power consumption level of the at least one master device electrically connected to the at least one master power outlet and controlling a supply of power from the power inlet to the at least one controlled power outlet responsive to a comparison of a characteristic of power delivered to the at least one master device with the characteristic of the stand-by power consumption level of the at least one master device.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the present disclosure the terms "master" and "primary" device or outlet are used interchangeably, as well as are the terms "secondary" and "controlled" device or outlet.

At least one embodiment of the invention is directed to an apparatus for controlling power to, for example, computer equipment and/or A/V equipment. For personal computer equipment, the power level consumed by a CPU in a stand-by power mode is in general consistent and standard. For A/V equipment, however, stand-by power consumption levels can vary significantly from one device and/or manufacturer to another. Thus, a power strip designed to monitor power consumption of a master A/V device, such as a television, and determine whether the device is in an active or a stand-by state by comparing the device power consumption with a predetermined standby-by power consumption level set-point may not actually "know" when an A/V component, having a different stand-by power consumption level, is truly in a stand-by state.

A smart stand-by power tracking (SSPT) master/controlled device power controller according to at least one embodiment of the present invention does not have a pre-defined power consumption set-point for determining a stand-by state of a master device. The stand-by power consumption level of a master device that is to be connected to a master power outlet of the device power controller is not defined in the controller prior to the controller being initialized to work with a particular master device. Instead, the master/controlled device power controller measures characteristics of a connected master device, automatically determines and tracks the stand-by power consumption level of the device based on the measured characteristics and stores the measured data to a memory, such as an EEPROM memory, to be used as a reference point for master device stand-by mode detection. In one embodiment, the master/controlled device power controller automatically tracks and measures the stand-by power consumption level of a connected master device upon determining that a new master device has been connected to the controller. In another embodiment, a user may be able to manually activate the master/controlled device power controller to track and measure the stand-by power consumption level of a connected master device. In some embodiments, the measured data may be used to define at least one of a controlled device activation and a controlled device deactivation power consumption trigger level. These activation and deactivation power consumption trigger levels (set-points) may, but not necessarily be the same. Also, in some embodiments, successful completion of the master device stand-by power tracking is communicated to a user by an indicator, such as an LED.

If a user changes a master device connected to the device power controller and the new master device has a different stand-by power consumption level than the previous master device, the device power controller will repeat the process of measuring characteristics of the new connected master device, automatically determining and tracking the stand-by power consumption level of the new device based on the measured characteristics, and using that new stand-by power level as the reference point for master device stand-by mode detection. Therefore, by adjusting the stand-by power consumption level based on measured characteristics of a connected master device, the device power controller is able to automatically adapt to different devices connected to the device power controller. At least one embodiment of the present invention provides a universal solution for a power saving smart power strip compatible with different master devices that have a stand-by power saving mode.

Figure 1:
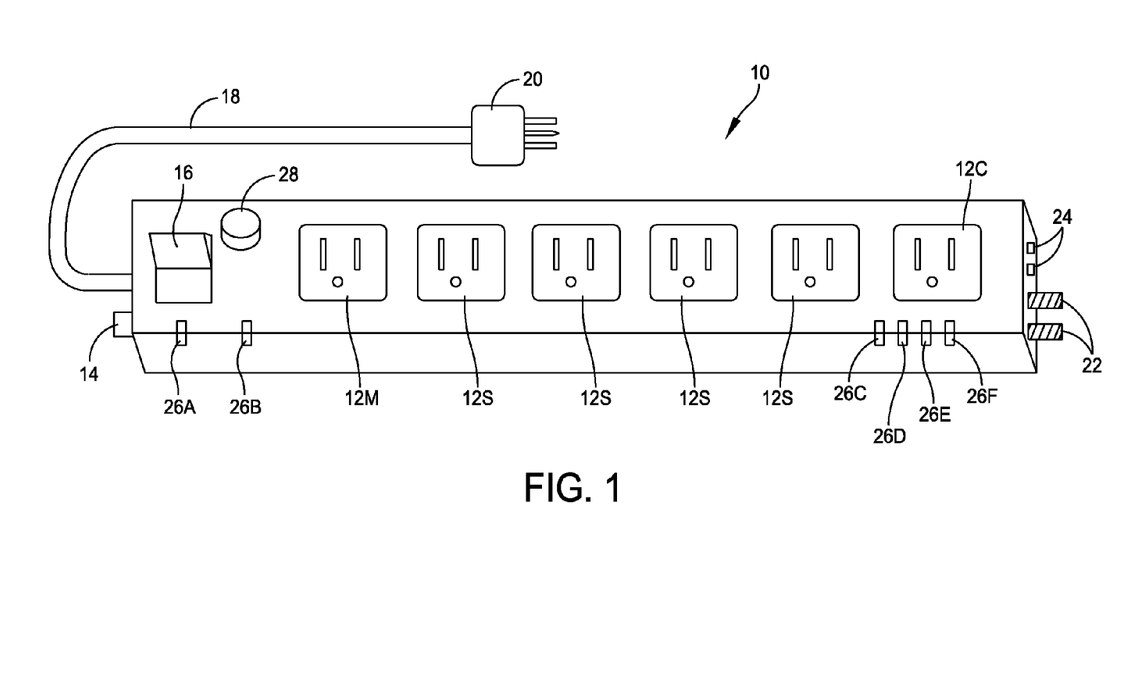
FIG. 1 is power strip according to an embodiment of the present invention.

Illustrated in FIG. 1 is a power strip 10 in accordance with one embodiment of the smart stand-by power tracking technology of the present invention. Power strip 10 has one master device outlet 12M, and four controlled device outlets 12S. Power to controlled device outlets 12S is disrupted in response to a device plugged into the master outlet 12M entering a stand-by mode or sleep state. Power strip 10 also includes a constant power outlet 12C, which may be utilized for connecting a device to which a user desires power to be delivered regardless of the status of a device plugged into the master outlet 12M.

Power strip 10 includes an internal circuit breaker, EMI filter/surge protector, and ground fault detector (not shown). Power strip 10 includes a power reset switch 14 in addition to a main power switch 15. Power reset switch 14 may be utilized to restore power to the outlets of the power strip if the power is discontinued by, for example, the circuit breaker or ground fault detector. Power strip 10 also includes a power inlet, comprising power cord 18 and plug 20, for plugging into an external source of power to receive power and supply power to the power strip.

Power strip 10 also includes connections for coaxial cables 22 and/or telephone lines 24 to enable signals travelling along a connected coaxial cable and/or telephone line to be routed through the internal EMI filter/surge protector to provide protection to these lines.

Power strip 10 includes indicators 26A-26F which comprise LEDs, although other suitable light emitting devices or indicators may be present in alternate embodiments. Indicators 26A-26F are used to indicate various operating conditions of power strip 10, including the condition that power is being supplied to the power strip, that power is being supplied to the master and/or controlled device outlets, that a fault condition exists, that a stand-by power level set-point of a master outlet has been met or exceeded, and that a stand-by power test is being performed or has been completed. In alternate embodiments, more or fewer indicators may be present and one or more of these indicators may indicate other operating conditions, as will be explained further below.

In one embodiment, power ship 10 also includes a stand-by power tracking enable switch 28, whose function will be discussed further below. In other embodiments, power strip 10 includes a plurality of master outlets 12M, at least one controlled device outlet 12S, and optionally, one or more constant power outlets 12C. In some embodiments where there is more than one master outlet, for example two master outlets, the controlled device outlet(s) are deactivated in response to a device connected to either of the master outlets entering a stand-by mode. In other embodiments where there is more than one master outlet, for example two master outlets, the controlled device outlet(s) are deactivated in response to devices connected to each of the master outlets entering stand-by modes. In some aspects, under the condition that each of two master devices has entered stand-by mode, and the controlled device outlet or outlets have been deactivated, the controlled device outlet(s) may be reactivated in response to either one or both of the master devices re-entering active versus stand-by mode. The master power consumption set-points for activation and deactivation of the controlled outlets(s) may be the same or may be different for each of the master outlets.

Alternate embodiments of power strip 10 may include additional features or elements, or may lack one or more of the elements described above, such as an internal circuit breaker, EMI filter/surge protector, ground fault detector, constant power outlet(s), stand-by power tracking enable switch, and coaxial cable or telephone line connections.

Figure 2:
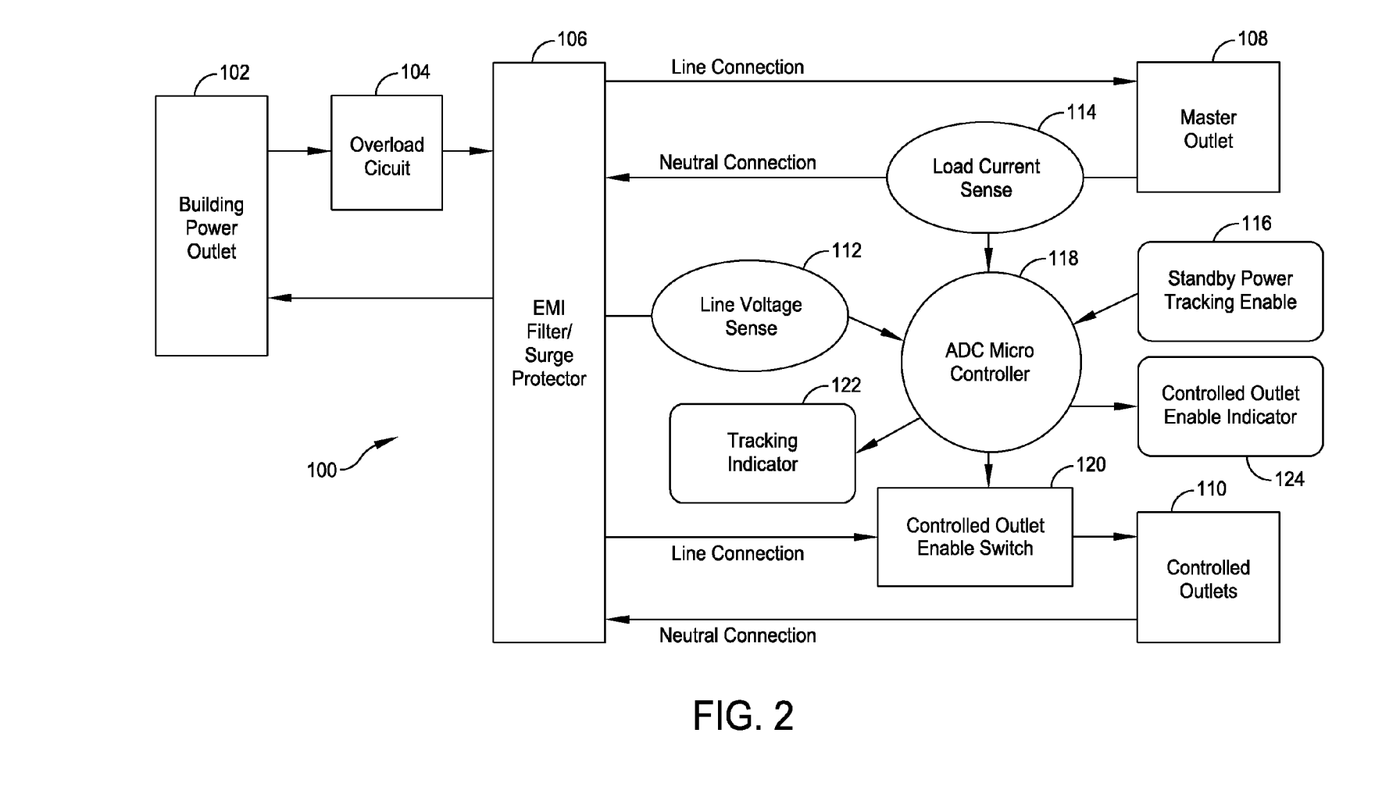
FIG. 2 is a block diagram of a smart stand-by power tracking master/controlled device controller according to an embodiment of the present invention.

FIG. 2 is a functional block diagram of a smart stand-by power tracking system (SSPT) 100 included in power strip 10. SSPT 100 controls the power delivered to controlled outlets 12S of power strip 10 in response to a total amount of power delivered to a master device (not shown) through a master outlet 12M. SSPT 100 discontinues the power delivered to the controlled outlets 12S of power strip 10 when a characteristic of the power delivered to the master outlet 12M falls below a first set-point defined by the master device stand-by mode power consumption. SSPT 100 re-enables power delivery to controlled power outlets 12S whose power has been discontinued when a characteristic of the power delivered to the master outlet 12M rises above a second set-point defined by the master device stand-by mode power consumption.

The power delivered to the master device is a product of the current and the voltage delivered to the master device (Power (Watts)=Voltage (Volts)×Current (Amps)). SSPT 100 monitors both the line voltage and the actual current delivered to a connected master device and computes a total power consumption of the connected master device, as will be described further below. This is desirable when a connected master has a stand-by or sleep mode which draws a defined amount of power. If a defined amount of power is consumed in stand-by mode, measuring the current delivered to the master device alone would not be a true measure of power consumption if the line voltage were to change. For example, if a set amount of power was consumed by a master device in stand-by mode, and the line voltage dropped, then ideally, the current drawn by the master device in stand-by mode would increase.

SSPT 100 sets a stand-by mode detection set-point for the master device based on a measure of total power delivered to the master in stand-by mode rather than current delivered to the master in stand-by mode. This is because a stand-by mode detection set-point based solely on current delivered to a master device in stand-by mode may not be desirable for master devices configured to consume a specific amount of power, as opposed to, for example, a specific amount of current in stand-by mode for the reasons described above.

In alternate embodiments, however, SSPT 100 may measure just the current delivered to a connected master device, and in some embodiments SSPT 100 may be configured by a user to measure either the current or the power delivered to a master device, or both.

Block 102 of FIG. 2 represents a source of power for SSPT 100. This source of power is in one embodiment single phase 120 Volt 60 Hz utility power, but in other embodiments may be three-phase power, single phase power having a different voltage and/or frequency, or power from an uninterruptable power supply unit. Power entering SSPT 100 passes through an overload circuit breaker 104. This circuit breaker is configured to discontinue power to all connected devices during abnormal load and/or short circuit conditions. SSPT 100 also includes EMI filter/surge protector circuit 106 electrically connected to an output of overload circuit breaker 104. The EMI Filter/surge protector circuit 106 eliminates unwanted electrical "noise" that might interfere with A/V signals that may be delivered to devices connected to SSPT 100, thus facilitating high fidelity sound and better picture quality in connected A/V products. Some A/V devices are very sensitive to power surges such as those associated with lightning strikes, so EMI filter/surge protector circuit 106 is configured to clamp incoming voltage surges that are generated by lightning strikes across the distribution power lines. For example, an incoming power surge of 6,000 V generated by a lightning strike would be clamped down by the EMI filter/surge protector circuit 106 to less than about 330 V, rendering it harmless to connected A/V equipment. EMI filter/surge protector circuit 106 is also utilized to remove noise and protect against power surges in coaxial cables or telephone lines connected to power strip 10.

Master outlet 108 of SSPT 100 is electrically connected to an output of EMI filter/surge protector circuit 106 and provides filtered and surge-protected AC power. Equipment or master devices which have a stand-by power saving feature can be connected to this outlet A non-exhaustive list of master device types that may be connected to master outlet 108 includes television sets, personal computers (PCs), and A/V receivers and/or controllers. The SSPT 100 constantly checks for the connection of a new master device or for a tracking command from the user to measure the stand-by power of this outlet.

Master-controlled peripherals (secondary devices) may be connected to controlled device outlets 110. In one embodiment, these outlets correspond to outlets 12S of power strip 10. These outlets draw power from an electrical connection to EMI filter/surge protector circuit 106 by way of a controlled outlet enable switch 120, which is discussed below. The type of controlled equipment connected to controlled device outlets 110 may depend on the functionality of the master device connected to master outlet 108. For example, if the master device is a television (TV) set, a non-exhaustive list of possible controlled devices may include DVD/VCD players, VCRs, set-up boxes, and/or satellite receivers. As the master device (the TV set) enters power-saving stand-by mode, the peripherals may be idle but still consuming power. The SSPT power controller constantly monitors master outlet 108 in order to detect the master device's power saving mode transition, and upon this transition shuts down idle controlled peripherals so that they will not consume power.

As discussed above, the SSPT 100 may automatically initiate an algorithm to track and measure the stand-by power level of a connected master device. However, according to one embodiment, the SSPT 100 may also include a standby power tracking enable switch (SPTE) 116 which is utilized to initiate an algorithm to measure and track a power consumption level associated with a master device stand-by state. SPTE 116 is in one embodiment a momentarily-on push button switch which is electrically connected to microcontroller 118 via an analog to digital converter (not shown). In one embodiment, SPTE 116 corresponds to button 28 as illustrated on power strip 10. During operation of power strip 10, SSPT 100 constantly monitors the state of SPTE 116. The user may momentarily activate SPTE 116 to command the microcontroller 118 of SSPT 100 to track and measure the stand-by power of the master and calculate a power consumption level of the connected master indicative of the master being in a stand-by power saving state. A representation of a characteristic of the measured stand-by power consumption level, such as total power drawn, is stored and used as a reference for controlled device power control.

SSPT 100 further comprises a master load current sensor circuit 114 which is electrically connected between an outlet of EMI filter/surge protector circuit 106 and a terminal of master outlet 108. Master load current sensor circuit 114 generates an electrical current sense signal based on the current draw of a master device connected to the master outlet 108. This electrical current sense signal is measured by microcontroller 118 after analog to digital conversion. In some embodiments, a representation of the measured master electrical current signal is stored in the microcontroller memory for reference by the microcontroller 118.

SSPT 100 includes a line voltage sensor circuit 112 in electrical communication with EMI filter/surge protector circuit 106 which generates a voltage sense signal based on the voltage provided by the EMI filter/surge protector circuit 106. The voltage level supplied by EMI filter/surge protector circuit 106 is common to the master and controlled device outlets. This voltage sense signal is measured by microcontroller 118 after analog to digital conversion. In some embodiments, a representation of the measured voltage signal is stored in the microcontroller memory for reference by the microcontroller 118.

Microcontroller 118 includes an internal analog to digital converter and EEPROM data memory. Microcontroller 118 may be any of a number of commercially available microcontrollers, for example, a PIC12F675 8-bit CMOS microcontroller, available from Microchip Technologies of 2355 West Chandler Blvd., Chandler, Ariz. After initializing the algorithm configured to track and measure the stand-by power consumption level of a connected master device (i.e. either automatically or upon activation of SPTE 116), and in some aspects, the signal conditioning of the master device's standby power, the microcontroller 118 processes the voltage and current sense signals supplied by voltage sensor circuit 112 and current sensor circuit 114, respectively, and stores the data in memory. The voltage and current sense signals are further processed by microcontroller 118 to obtain a measurement of the master device stand-by power consumption level. The calculated master device stand-by power consumption level is stored in the EEPROM to be used as a reference point for controlled device power control. Operation of the microcontroller 118 will be described in greater detail below.

Controlled outlet enable switch 120 comprises a relay that is configured to be enabled and/or disabled by the microcontroller 118. Controlled device enable switch 120 completes a circuit from EMI filter/surge protector circuit 116 to supply power to the controlled device outlet or outlets 110 when enabled. The microcontroller 118 is configured to close a relay of controlled device enable switch 120 when a connected master device is operational (when the master device power consumption level is higher than the stored stand-by power consumption level reference point), thus providing power from the power inlet of power strip 10 to the controlled device outlets 110. The microcontroller 118 is configured to open the relay if the master is in stand-by power saving mode, thus disabling the flow of power going to the controlled device outlets 110 and eliminating the idle power consumption of the controlled devices. In some aspects, controlled device enable switch 120 may comprise a solid state device such as a power transistor, rather than a relay.

Tracking indicator 122 is an LED indicator which provides confirmation of the SSPT setup. Tracking indicator 122 corresponds to indicator lamp 26B of power strip 10. This LED is deactivated unless and until the algorithm configured to track and measure the stand-by power consumption level of a connected master device is initialized.

Controlled device enable indicator 124 is a microcontroller-controlled LED indicator which assumes one state during normal master operation and assumes a second state when a connected master device is in stand-by mode. In one embodiment, controlled device enable indicator 124 corresponds to indicator lamp 26B of power strip 10 and will cause this indicator to display a different color than tracking indicator 122 when controlled device enable indicator 124 is activated. In some embodiments, one or more of indicators 26A-26F will activate or deactivate when a master device connected to a master outlet is in stand-by or power savings mode, or alternatively, indicator 26B may change color or brightness versus its state during normal master device operation, or may blink when the master device is in stand-by mode.

After the power consumption level of the master device in stand-by power saving mode is defined in the microcontroller system, the microcontroller 118 continues to monitor for the connection of a new master device and/or the activation of the SPTE switch 116. By doing this, the microcontroller 118 will know when a user has replaced the connected master and/or wishes to track the new stand-by power saving power consumption level of the connected master device. The stored stand-by power reference point of the previous master is replaced by the data measured with regard to the new master.

The microcontroller 118 constantly compares the current power consumption level of the master with the stored reference stand-by power consumption level reference point. If the measured master power consumption is the same as or lower than the stand-by power consumption reference point, then the microcontroller will conclude that the master is in stand-by power saving mode, and will shut down power to the controlled devices.

In some aspects, a separate turn-off set-point and turn-on set-point is established by the microcontroller 118 at which power may be disrupted or restored to the controlled device outlet or outlets 110, respectively. A higher power level may be used as a power consumption set-point for the turn-on set-point than for the turn-off set-point. A turn-off power consumption set-point may be set at the calculated master stand-by power consumption level, or in some aspects, a few percent, such as five percent or more, above or below this level. Similarly, a turn-on power consumption set-point may be established a few percent, such as five or ten percent, or in some aspects, up to fifty percent or more above the calculated master stand-by power consumption level. Setting different power levels at which power may be disrupted or restored to the controlled device outlet or outlets facilitates the creation of a hysteresis loop and reduces the potential for the controlled device outlets to be switched on and off repeatedly if the master device goes into stand-by mode. In some aspects, the sensitivity of SSPT 100 may be adjusted by, for example, a potentiometer or a set of potentiometers which may be used by a user to adjust the master device power consumption levels at which SSPT 100 may disrupt and/or restore power to controlled device outlet or outlets 110. In further aspects, a user may set power strip 10 so that power to controlled outlets 12S is not dependent upon the state of a master device that may be connected to master outlet 12M. In even further aspects, controlled power outlets 12S may be set to provide power even in the absence of a master device being connected to master outlet 12M.

In some aspects, microcontroller 118 continuously monitors signals from load current sensor circuit 114 and line voltage sensor circuit 112 and is configured to determine if power consumption levels of master outlet 108 in the active and/or stand-by modes have changed over time. Such a change may result from one master device being exchanged for a different master device. If microcontroller 118 determines that a change in the stand-by power consumption of master outlet 108 has occurred, in some aspects it will automatically initiate a routine to reset the stored reference power consumption threshold point of the master and determine the new master power consumption levels at which SSPT 100 may disrupt and/or restore power to controlled device outlet or outlets 110.

In some aspects, power strip 10 and/or SSPT 100 may be included in or used in conjunction with an uninterruptable power supply (UPS) system such as any of the UPS systems supplied by American Power Conversion Corp., of West Kingston, R.I.

Figure 3:
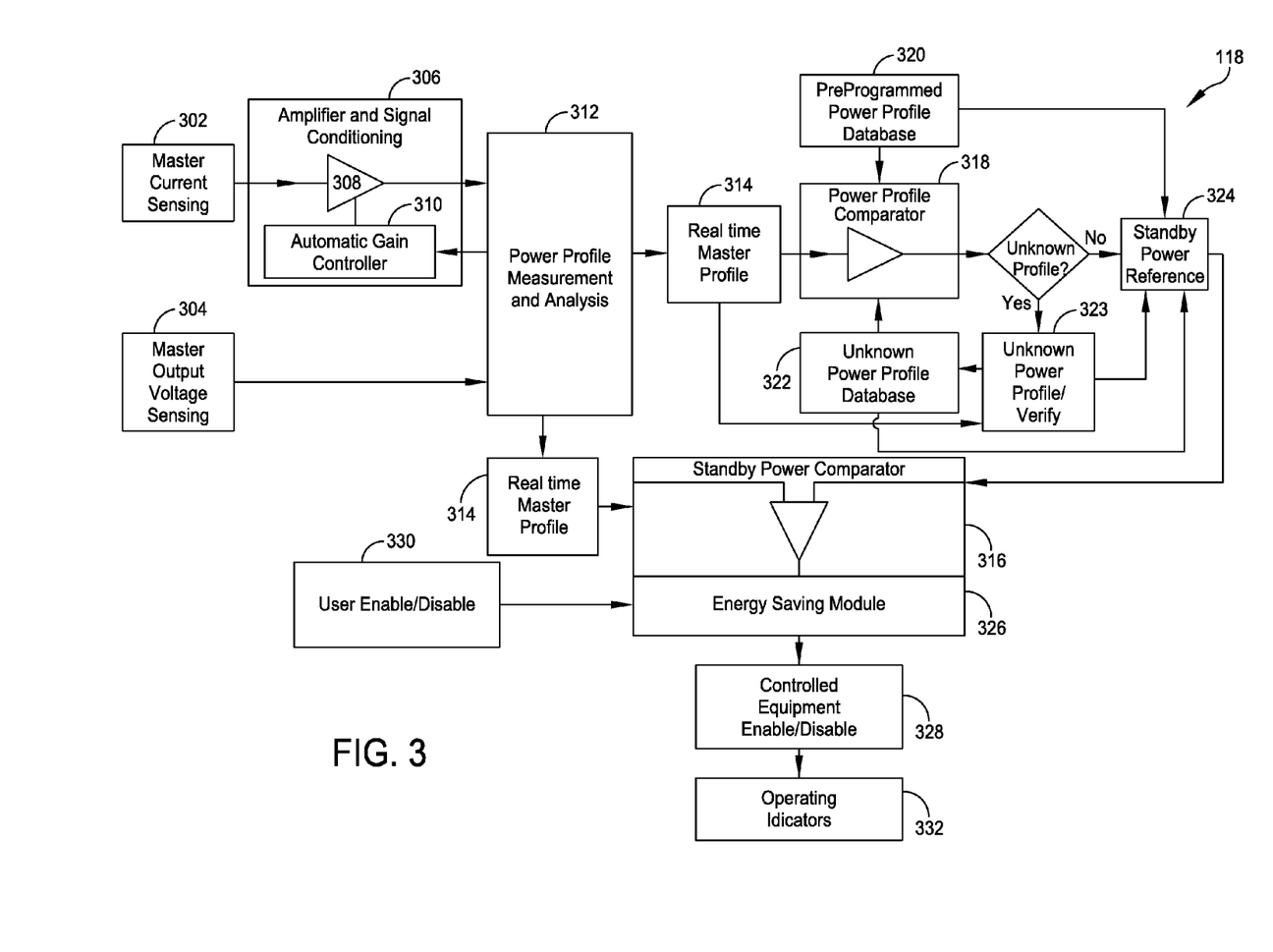
FIG. 3 is a block diagram of a microcontroller of the smart stand-by power tracking master/controlled device controller of FIG. 2 according to an embodiment of the present invention.

One embodiment of the operation of microcontroller 118 will now be described in reference to FIG. 3. Upon determining that a new master device has been connected to the master outlet 108 of power strip 10 and/or that the STPE switch 116 has been activated, the microcontroller 118 initializes the algorithm configured to track and measure the stand-by power consumption level of the connected master device. A master current sensing module 302 of the microcontroller 118 receives an electrical current sense signal (i.e. from master load current sensor circuit 114) based on the current draw of the master device connected to the master outlet 108. A master output voltage sensing module 304 receives a voltage sense signal (i.e. from line voltage sensor circuit 112) based on the voltage provided by the EMI filter/surge protector circuit 106.

An amplifier and signal conditioning module 306 receives the electrical current sense signal from the master current sensing module 302. An amplifier 308 and automatic gain controller 310 of the amplifier and signal conditioning module 306 are configured to increase the amplitude of low level electrical current sense signals, typically coming from such devices as laptop computers, and provide accurate, high resolution analog current signals to the power profile measurement and analysis module 312.

The power profile measurement and analysis module 312 converts the received analog current signals and voltage signals into digital form and calculates the power consumption level of the master device. Based on the calculated power consumption of the master device, the power profile measurement and analysis module 312 generates a real-time master load power profile 314 of the connected master device and determines the different operating modes (i.e. standby power mode and operating power mode) of the master device. Power profile generation and operation of the power profile measurement and analysis module 312 will be discussed in greater detail below.

Once the real-time master load power profile 314 and operating modes of the master device are determined, the power profile measurement and analysis module 312 transfers the real-time master load power profile 314 to a standby power comparator 316. The power profile measurement and analysis module 312 also transfers the real-time master load power profile 314 to a power profile comparator 318. The power profile comparator 318 compares the real-time master load power profile 314 with previously defined profile data stored in at least one power profile database. In one embodiment, the power profile comparator 318 compares the real-time master load power profile 314 with the profile data stored in both a pre-programmed power profile database 320 and an unknown power profile database 322.

The pre-programmed power profile database 320 is pre-programmed with power profile data from typical or known master devices. The unknown power profile database 322 includes artificially generated power profile data from previously monitored unknown master devices. If a determination is made by the power profile comparator 318 that the real-time master load power profile 314 is similar to a matching power profile stored in either the pre-programmed power profile database 320 or the unknown power profile database 322 (i.e. over a predefined number of matching instances), the stand-by power reference level 324 is extracted from the matching power profile and transferred to a standby power reference register of a standby power comparator 316.

If a determination is made by the power profile comparator 318 that the real-time master load power profile 314 is not similar to any power profile stored in the pre-programmed power profile database 320 or the unknown power profile database 322, the real-time master load power profile 314 is stored in a register and labeled as an unknown power profile 323. The unknown power profile 323 is compared with the current real-time power profile 314 of the master device from the power profile measurement and analysis module 312 to verify the accuracy of the unknown profile 323. If the unknown power profile 323 is verified (i.e. found to match the real-time master load power profile 314 for a pm-defined number of instances), then the unknown power profile 323 is saved in the unknown power profile database 322 as art artificially generated power profile and the stand-by power reference level 324 is extracted from the unknown power profile 323 and transferred to the standby power reference register of the standby power comparator 316. In one embodiment, the number of pre-defined instances in which the unknown power profile must match the real-time power profile in order to be verified may be adjustable to avoid false detection. If the unknown power profile 323 is found not to match the real-time master load power profile 314 of the master device for a pre-defined number of instances, the unknown power profile 323 is discarded and the current real-time master load power profile 314 is stored in the register to replace the previous unknown power profile 323 and the verification cycle repeats. Operation of the power profile comparator 318 will be discussed in greater detail below.

The standby power comparator 316 compares the real-time master load power profile 314 with the stand-by power reference level 324 to determine if the master device is operating in stand-by mode. Operation of the standby power comparator 316 will be discussed in greater detail below. Based on the determination of whether the master device is operating in stand-by mode, an energy saving module 326 will either enable the controlled devices 328, if the master device is in operating mode, or disable the controlled devices 328, if the master device is in standby mode. In one embodiment, a user is able to enable and disable the power saving function of the energy saving module 326 via a user enable/disable switch 330. According to one embodiment, operating indicators 332 (i.e. such as LED's described above), may be used to signal the operational status of the controlled equipment 328.

Figure 4:
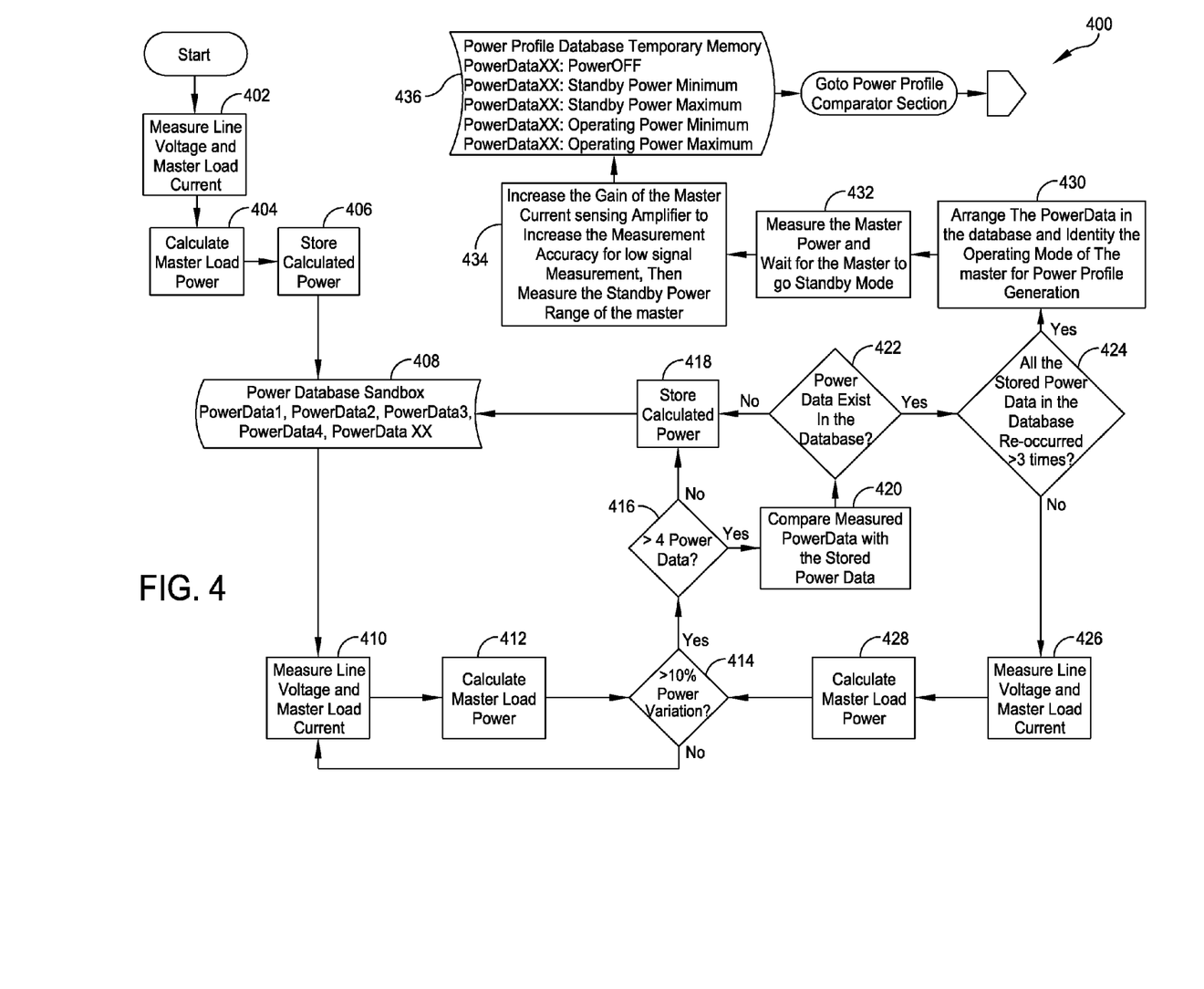
FIG. 4 is a flow chart of a method of operation of a power profile measurement and analysis module according to an embodiment of the present invention.

One embodiment of a method of operation of the power profile measurement and analysis module 312 will now be described in reference to the flow chart illustrated in FIG. 4. At block 402, the power profile measurement and analysis module 312 measures the line voltage and master load current of the connected master device. At block 404, using the measured voltage and current, the power profile measurement and analysis module 312 calculates the current power consumption level of the master load and at block 406 stores the current calculated power consumption level in a register 408.

At block 410, the power profile measurement and analysis module 312 again measures the line voltage and master load current of the connected master device and at block 412, calculates the current power consumption level of the master load. At block 414 a determination is made whether the current power consumption level varies from the previous power consumption level calculation by at least a certain percentage. As illustrated in FIG. 4, the percentage is defined as 10%; however, the percentage may be defined as any value. In response to a determination that the current power consumption level of the master load has not varied by more than 10%, the power profile measurement and analysis module 312 returns to blocks 410 and 412 and recalculates the current power consumption level of the master load.

In response to a determination that the power consumption level of the master load has varied by more than 10%, at block 416 the power profile measurement and analysis module 312 determines if the number of successful power calculations stored in the register 408 exceeds a defined number. As illustrated in FIG. 4, the defined number of power calculations is four; however the number of successful power calculations may be defined as any amount. In response to a determination that the number of successful power calculations is less than 4, at block 418 the current power consumption level is stored in the register 408.

In response to a determination that the number of successful power calculation is greater than 4, at block 420 the current power consumption level is compared to the other power calculations stored in the register. At block 422, a determination is made whether the current power consumption level is similar to a power calculation already stored in the register 408. In response to a determination that the current power consumption level is not similar to a power calculation stored in the register 408, the power profile measurement and analysis module 312 returns to block 418 and stores the current power consumption level in the register 408.

At block 424, in response to a determination that the current power consumption level is similar to a power calculation stored in the register 408, a determination is made whether the power calculations stored in the register 408 have re-occurred more than a pre-defined number of times. As illustrated in FIG. 4, the pre-defined number of times is 3; however the number of times may be defined as any amount. In response to a determination that the power calculations stored in the register 408 have not re-occurred more than 3 times, at blocks 426 and 428, the power profile measurement and analysis module 312 recalculates the current power consumption level of the master load and returns to block 414.

In response to a determination that the power calculations stored in the register have re-occurred more than 3 times, at block 430 the power profile measurement and analysis module 312 arranges the power calculations stored in the register to identify the operating power mode range of the master load (i.e. a minimum operating power mode set-point and a maximum operating power mode set-point).

At block 432, the power profile measurement and analysis module 312 measures the power consumption of the master load and waits for the master load to enter standby mode. Once the master load enters standby mode, the power profile measurement and analysis module 312 measures the standby power range of the master load (i.e. a stand-by power minimum set-point and a stand-by power maximum set-point). Also at block 434, the power profile measurement and analysis module 312 may increase the gain of the master load current sensing amplifier 308, via the automatic gain controller 310, in order to increase the measurement accuracy for low signal measurement.

At block 436, the power profile measurement and analysis module 312 saves the real-time power profile of the master load in temporary memory. According to one embodiment, the power profile of the master load may include set-points indicating a power-off mode, a stand-by power minimum, a stand-by power maximum, a critical boundary, a minimum operating power mode and a maximum operating power mode. It is to be appreciated that the power profile may include any number and type of modes. The power profile of the master load will now be discussed in greater detail with regards to FIG. 5.

Figure 5:
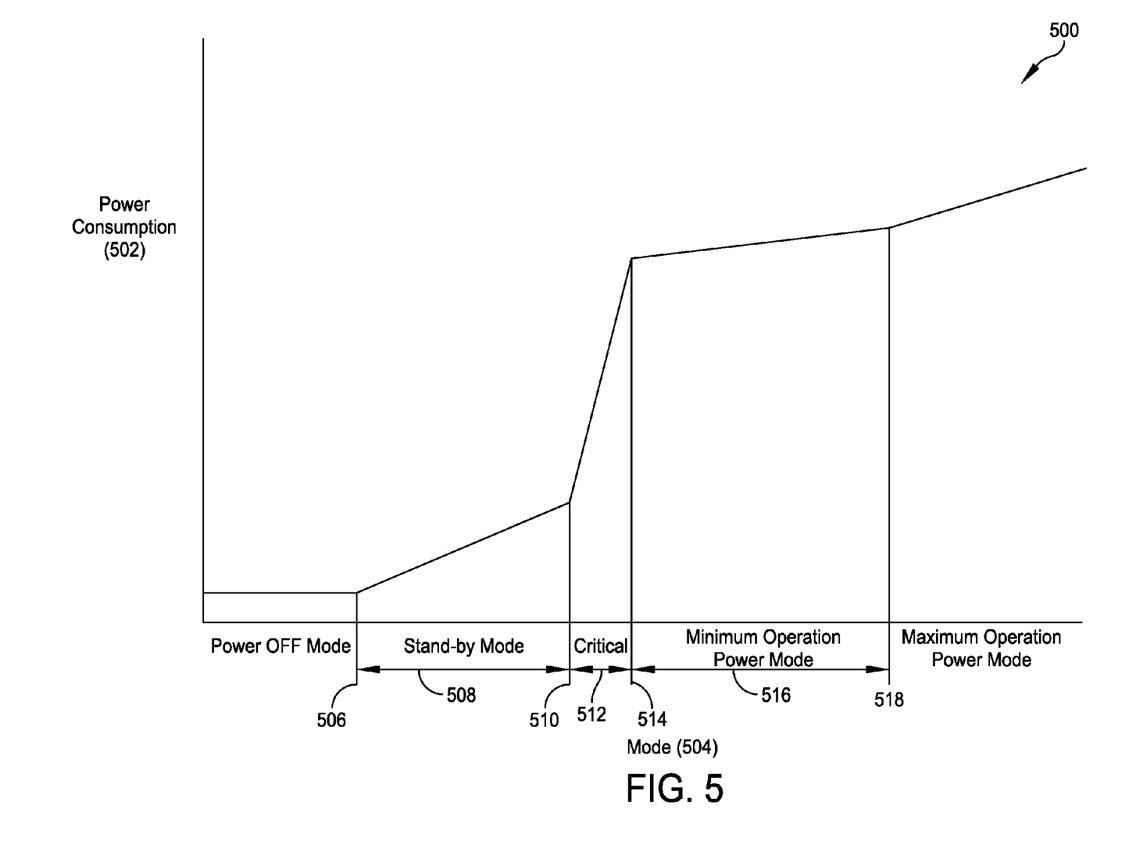
FIG. 5 is a graph illustrating a master load power profile according to an embodiment of the present invention.

FIG. 5. is a graph illustrating one embodiment of a master power profile 500 of a master load generated by the power profile measurement and analysis module 312. The graph displays the power consumption 502 of the master load over varying modes 504. As discussed above, the power profile measurement and analysis module 312 generates the power profile 500 by monitoring the power consumption of the master load over time and defining different set-points of the master load. When the power consumption of the master load is below a stand-by mode minimum set-point 506, the master load is in a power-off mode. Over the interval 508, between the stand-by mode minimum set-point 506 and a stand-by mode maximum set-point 510, the master load is in stand-by mode.

When the power consumption of the master load is within interval 512, between the stand-by mode maximum set-point 510 and the operating mode minimum set-point 514, the power consumption of the master load is considered to be in a critical boundary. Over the critical boundary 512, the power consumption of the master load increases relatively dramatically and indicates a shift between stand-by and operating modes.

Over the interval 516, between the operating mode minimum set-point 514 and the maximum operating mode set-point 518, the master load is in a minimum operating power mode. When the power consumption of the master load is above the maximum operating mode set-point 518, the master load is in a maximum operating power mode.

Upon generating the real-time power profile of the master load, the power profile measurement and analysis module 312 passes the real-time power profile to the power profile comparator 318. One embodiment of a method of operation of the power profile comparator 318 will now be described in reference to FIG. 6

Figure 6:
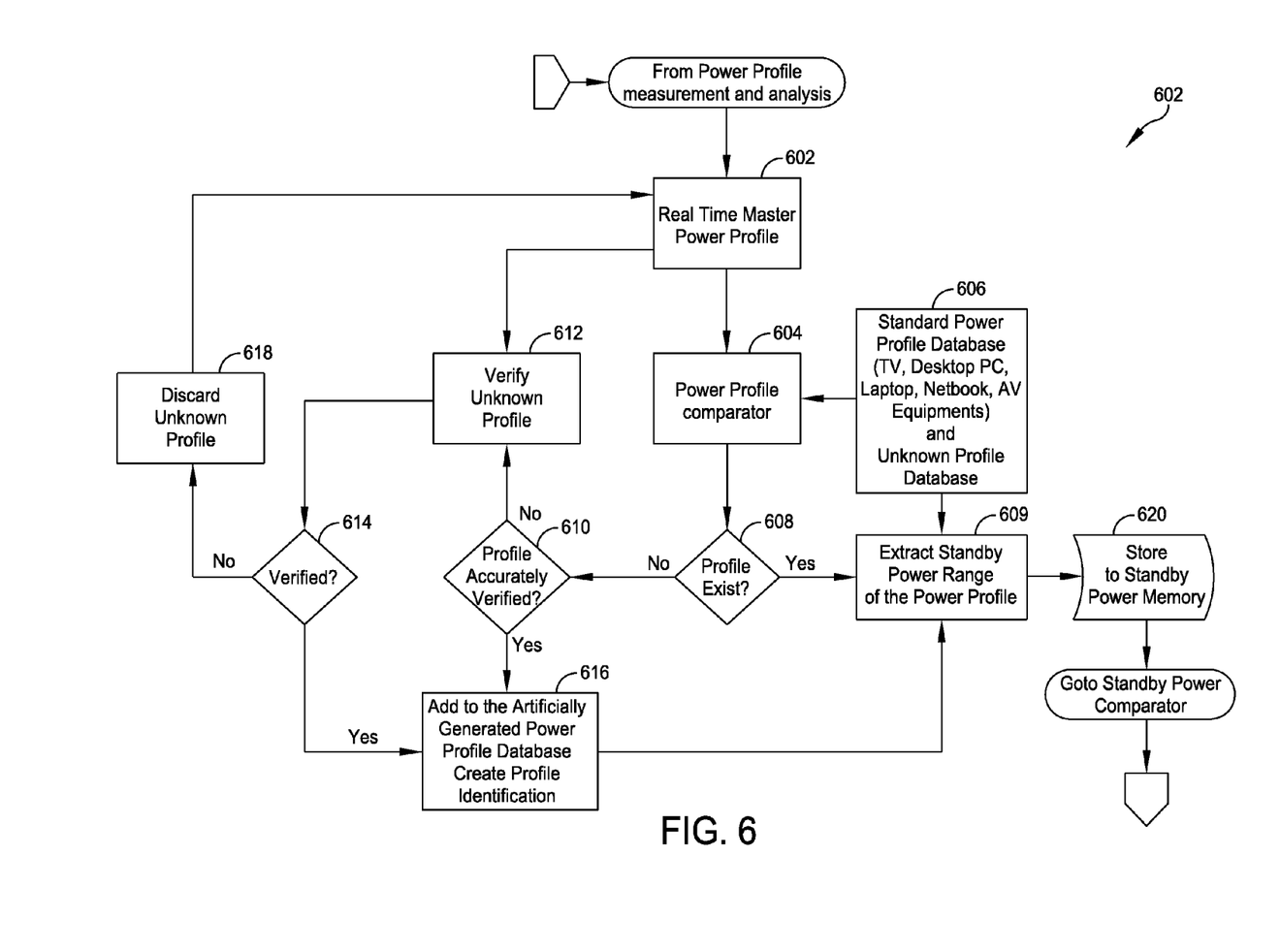
FIG. 6 is a flow chart of a method of operation of a power profile comparator module according to an embodiment of the present invention.

FIG. 6 is a flow chart 600 of a method of operation of the power profile comparator 318 according to an embodiment of the present invention. At block 602, the power profile comparator 318 receives the real-time master load power profile 314 from the power profile measurement and analysis module 312. At block 604, the power profile comparator 318 compares the real-time power profile with power profiles stored in the pre-defined power profile databases 606. In one embodiment, the pre-defined power profile databases 606 include the pre-programmed (standard) power profile database 320 and the unknown (artificially generated) power profile database 322. As discussed above, the pre-programmed power profile database 320 is pre-programmed with power profile data from typical or known master devices (i.e. TV's, desktop PC's, laptops, netbooks, AV equipment etc.) and the unknown power profile database 322 includes artificially generated power profile data from previously monitored unknown master devices.

At block 608, a determination is made whether the real-time profile is similar to one of the stored profiles in the power profile databases 606. In response to a determination that the real-time power profile is similar to at least one profile stored in the power profile databases 606, at block 609 the stand-by power range of the similar stored profile is extracted from the power profile databases 606 and labeled as the stand-by power reference.

In response to a determination that the real-time power profile is not similar to a profile in the power profile databases 606, the real-time profile is labeled as an unknown profile and at block 610 a determination is made whether the unknown profile has previously been accurately verified. In response to a determination that the unknown profile has been previously verified, at block 616 the unknown profile is added to the artificially generated power profile database 322. Upon adding the unknown profile to the artificially generated power profile database 322, at block 609 the stand-by power range of the unknown profile is extracted from the unknown profile and stored, at block 620, as the stand-by power reference in standby power memory.

In response to a determination that the unknown profile has not been previously verified, at block 612 the unknown profile is compared to the current real-time power profile from the power profile measurement and analysis module 312. At block 614, a determination is made whether the unknown profile is accurately verified. The unknown profile is considered to be verified if the unknown profile is substantially similar to the real-time power profile over a number of matching instances. It is to be appreciated that the number of matching instances may be pre-defined and/or adjusted as any amount to avoid false detection.

In response to a determination that the unknown profile is not substantially similar to the real-time power profile over a number of matching instances, the unknown profile is discarded at block 618 and the method beginning at block 602 is repeated with the current real-time power profile.

In response to a determination that the unknown profile is substantially similar to the real-time power profile over a number of matching instances, the unknown profile is considered to be accurately verified and, at block 616 the unknown profile is added to the artificially generated power profile database 322. Upon adding the unknown profile to the artificially generated power profile database 322, at block 609 the stand-by power range of the unknown profile is extracted from the unknown profile and stored, at block 620, as the stand-by power reference in standby power memory.

Figure 7:
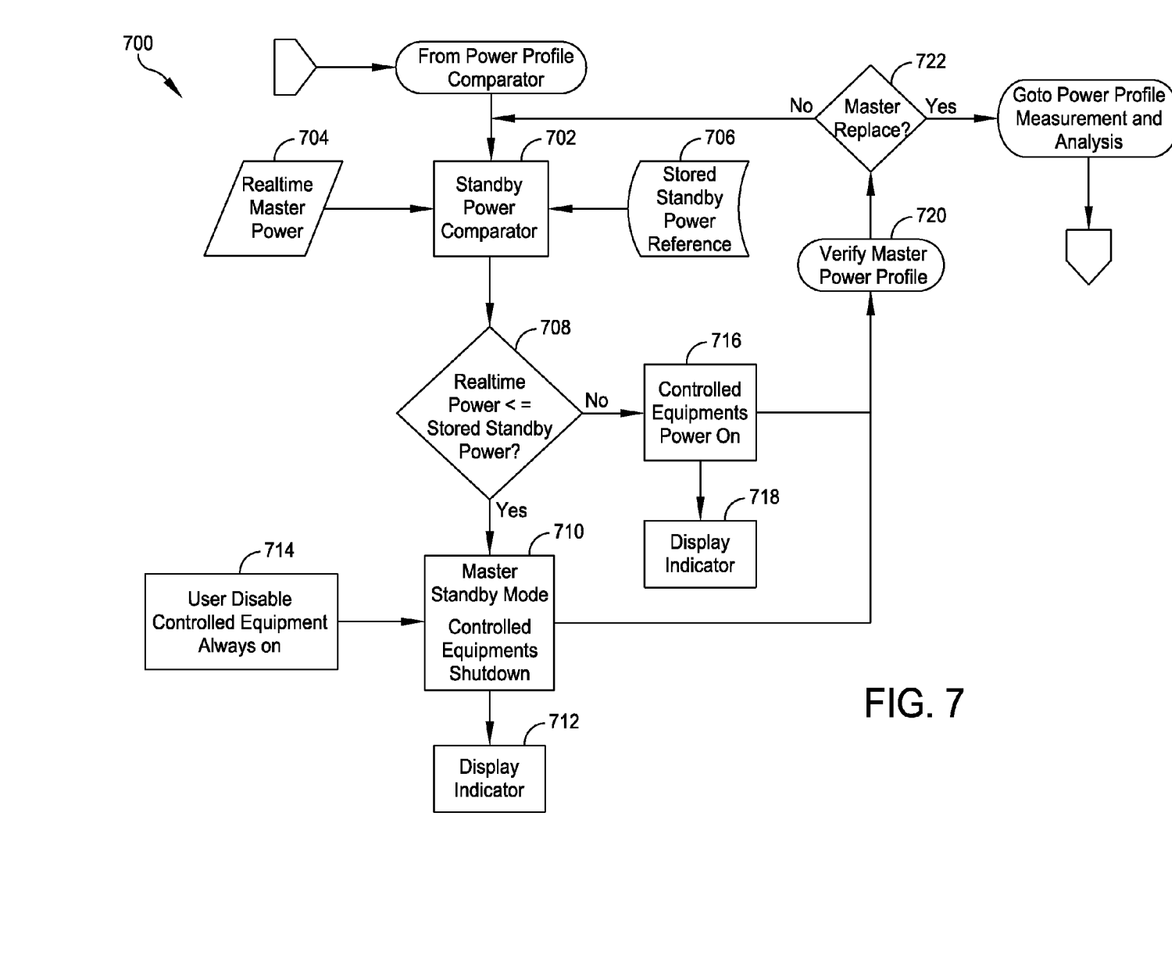
FIG. 7 is a flow chart of a method of operation of a standby power comparator module according to an embodiment of the present invention.

FIG. 7 is a flow chart 700 of a method of operation of the standby power comparator 316 according to an embodiment of the present invention. At block 702, the current real-time power consumption of the master load 704, from the real time power profile 314 provided by the power profile measurement and analysis module 312, is compared to the stored standby power reference 706 from the power profile comparator 318.

At block 708 a determination is made whether the current real-time power consumption of the master load 704 is less than or equal to the stored standby power reference 706. In response to a determination that the current real-time power consumption of the master load 704 is less than or equal to the stored standby power reference 706, at block 710 the master load is recognized as in standby mode and the controlled equipment 328 is disabled. At block 712, once the controlled equipment 328 is disabled, indicators, such as the LED's described above, signal the disabling of the controlled equipment 328. According to one embodiment, at block 714, a user may disable the standby power comparator 316 via an enable/disable switch 330 and set the controlled equipment 328 as "always on".

In response to a determination that the current real-time power consumption of the master load 704 is greater than the stored standby power reference 706, at block 716 power is provided to the controlled equipment 328 and at block 718, indicators, such as the LED's describe above, signal the powering of the controlled equipment 328.

At block 720, the power profile of the master load is compared against the current real-time power profile of the master load from the power profile measurement and analysis module 312 to verify the power profile. At block 722, a determination is made, based on if the power profile is verified, whether the master load has been replaced. In response to a determination that the master load has not been replaced, the method returns to block 702. In response to a determination that the master load has been replaced, the method returns to block 402 of the power profile measurement and analysis module 312 to reanalyze the power profile of the new master load.

The preceding description of FIGS. 3-7 assumed multiple controlled outlets and a single master outlet, but this process flow is also applicable to aspects of the invention including a single controlled outlet and one or more constant power outlets. Further, in some aspects, SSPT 100 may include multiple master power outlets and the acts of FIGS. 3-4, and 6-7 may be performed for each master outlet to which a master device is connected.

In further aspects SSPT 100 may have a default stand-by power set point that is utilized prior to initialization or that is used in case of some sort of fault where a defined stand-by power set point is somehow erased or rendered inaccessible.

Also, even though the invention is described above in relation to a power strip 10, it is to be appreciated that the present invention may be utilized with other power devices such as surge protectors, Uninterruptible Power Supplies (UPS), industrial power saving devices and home automation systems.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An apparatus for controlling application of power to a plurality of devices including at least one master device and at least one controlled device, the apparatus comprising:
    a power inlet constructed and arranged to receive power from a power source;
    a plurality of power outlets including at least one master power outlet and at least one controlled power outlet;
    a sense circuit adapted to sense at least one first characteristic of power delivered to the at least one master power outlet; and
    a controller adapted to:
        generate at least one first power profile corresponding to the at least one first characteristic;
        compare the at least one first power profile with at least one second power profile stored in at least one profile database and determine whether the at least one first power profile is similar to the at least one second power profile;
        determine a characteristic of a stand-by power consumption level of a device electrically connected to the at least one master power outlet, wherein the stand-by power consumption level is extracted from the at least one second power profile in response to a determination that the at least one first power profile is similar to the at least one second power profile, and wherein the stand-by power consumption level is extracted from the at least one first power profile in response to a determination that the at least one first power profile is not similar to the at least one second power profile;
        compare the first characteristic of power delivered to the at least one master power outlet with the characteristic of the stand-by power consumption level; and
        control a supply of power from the power inlet to the at least one controlled outlet responsive to the comparison of the first characteristic of power with the characteristic of the stand-by power consumption level.

2. The apparatus of claim 1, wherein the at least one first characteristic of power delivered to the at least one master power outlet is current.

3. The apparatus of claim 2, wherein the at least one first characteristic of power delivered to the at least one master power outlet further comprises voltage.

4. The apparatus of claim 1, wherein the characteristic of the stand-by power consumption level is total power.

5. The apparatus of claim 1, wherein the characteristic of the stand-by power consumption level is current.

6. The apparatus of claim 1, further comprising a non-volatile memory configured to store a representation of the stand-by power consumption level.

7. The apparatus of claim 1, wherein the at least one profile database includes a pre-programmed profile database.

8. The apparatus of claim 1, wherein in response to a determination that the at least one first power profile is not similar to the at least one second power profile, the controller is further adapted to store the at least one first power profile in the at least one profile database.

9. The apparatus of claim 1, further comprising an uninterruptable power supply.

10. A method of controlling power distribution to a plurality of devices including at least one master device and at least one controlled device, the at least one master device having at least a first mode of operation and a second mode of operation, with the second mode of operation being a lower power mode of operation than the first mode of operation, the method comprising:

providing power to the at least one master device through at least one primary outlet;

sensing at least one characteristic of the power provided through the at least one primary outlet with the at least one master device in the second mode of operation;

generating, based on the act of sensing, a first power profile of the at least one master device;

comparing the first power profile with at least one second power profile stored in at least one database and determining whether the first power profile is similar to the at least one second power profile;

setting a first threshold characteristic of the power provided through the primary outlet, wherein the first threshold characteristic is extracted from the at least one second power profile in response to a determination that the first power profile is similar to the at least one second power profile, and wherein the first threshold characteristic is extracted from the first power profile in response to a determination that the first power profile is not similar to the at least one second power profile;

providing power, in the first mode of operation, to the at least one controlled device through a secondary outlet;

measuring an operating characteristic of power provided through the primary outlet; and controlling power to the at least one controlled device responsive to the measured operating characteristic of power provided through the primary outlet.

11. The method of claim 10, further comprising verifying, in response to a determination that the first power profile is not similar to the at least one second power profile, whether the first power profile is accurate.

12. The method of claim 11, further comprising storing, in response to a determination that the first power profile is accurate, the first power profile in the at least one database.

13. The method of claim 10, wherein sensing the at least one characteristic of power provided through the primary outlet to the master device is initiated manually by a user.

14. The method of claim 10, further comprising providing an indication that the master device is operating in the second mode of operation.

15. The method of claim 10, further comprising removing, in the second mode of operation, power to the at least one controlled device responsive to the operating characteristic of power provided through the primary outlet being at least one of the same as or less than the first threshold characteristic of the power provided through the primary outlet.

16. The method of claim 10, further comprising setting a second threshold characteristic of power provided through the primary outlet based on the sensed characteristic of the power provided through the primary outlet.

17. The method of claim 16, wherein the act of providing power, in the first mode of operation, to the at least one controlled device through a secondary outlet comprises providing power to the at least one controlled device responsive to the operating characteristic of power provided through the primary outlet being greater than the second threshold characteristic of the power provided through the primary outlet.

18. The method of claim 10, further comprising replacing the at least one master device with at least one second master device, the at least one second master device having at least a first mode of operation and a second mode of operation, with the second mode of operation being a lower power mode of operation than the first mode of operation;

providing power to the at least one second master device through the at least one primary outlet;

sensing at least one characteristic of the power provided through the primary outlet with the second master device in the second mode of operation;

generating, based on the act of sensing, a third power profile of the at least one second master device;

comparing the third power profile with the at least one second power profile stored in the at least one database and determining whether the third power profile is similar to the at least one second power profile; and setting a third threshold characteristic of the power provided through the primary outlet, wherein the third threshold characteristic is extracted from the at least one second power profile in response to a determination that the third power profile is similar to the at least one second power profile, and wherein the third threshold characteristic is extracted from the third power profile in response to a determination that the third power profile is not similar to the at least one second power profile.

19. The method of claim 18, wherein sensing the at least one characteristic of the power provided through the primary outlet with the second master device in the second mode of operation is initiated manually.

20. An apparatus for controlling application of power to a plurality of devices including at least one master device and at least one controlled device, the apparatus comprising:

a power inlet constructed and arranged to receive power from a power source;

a plurality of power outlets including at least one master power outlet and at least one controlled power outlet; and means for generating a first power profile of at least one master device electrically connected to the master power outlet, for determining a characteristic of a stand-by power consumption level of the at least one master device electrically connected to the at least one master power outlet wherein the stand-by power consumption level is extracted from a second power profile in response to a determination that the first power profile is similar to the second power profile, and wherein the stand-by power consumption level is extracted from the first power profile in response to a determination that the first power profile is not similar to the second power profile, and for controlling a supply of power from the power inlet to the at least one controlled power outlet responsive to a comparison of a characteristic of power delivered to the at least one master device with the characteristic of the stand-by power consumption level of the at least one master device.

* * * * *